(12) United States Patent
Yamada et al.

(10) Patent No.: US 6,228,481 B1
(45) Date of Patent: May 8, 2001

(54) COMPOSITE MATERIAL HAVING DISCONTINUOUS THREE-DIMENSIONAL NETWORK STRUCTURE AND PRODUCTION THEREOF

(75) Inventors: Katsunori Yamada; Nobuo Kamiya, both of Aichi (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 0 days.

(21) Appl. No.: 09/044,875

(22) Filed: Mar. 20, 1998

Related U.S. Application Data (62) Division of application No. 08/651,624, filed on May 22, 1996, now Pat. No. 5,835,841, which is a continuation of application No. 08/139,036, filed on Oct. 21, 1993, now abandoned.

(30) Foreign Application Priority Data

Oct. 21, 1992 (JP) .................................................. 4-308195
Aug. 20, 1993 (JP) .................................................. 5-227888

(51) Int. Cl.[7] ....................................................... B32B 5/16
(52) U.S. Cl. ................................ 428/328; 419/6; 419/10; 419/13; 419/14; 419/19; 419/23; 419/38; 428/329; 428/331; 428/403; 428/404; 428/407
(58) Field of Search ....................................... 428/403, 407, 428/404, 328, 329, 331; 264/43, 45.1; 419/10.13, 23, 38, 14, 6, 19

(56) References Cited

U.S. PATENT DOCUMENTS

| | | |
|---|---|---|
| 2,942,334 | 6/1960 | Blue . |
| 3,141,786 | 7/1964 | Bugosh . |
| 3,460,920 | 8/1969 | Long et al. . |
| 3,748,728 | 7/1973 | Watson . |
| 3,846,084 | 11/1974 | Pelton . |
| 3,917,149 | 11/1975 | Breton et al. . |
| 3,966,421 | 6/1976 | Townsend, Jr. et al. . |
| 4,204,863 | 5/1980 | Schreiner . |
| 4,310,601 | 1/1982 | Becnauer et al. . |
| 4,374,900 | 2/1983 | Hara et al. . |
| 4,404,263 | 9/1983 | Hodes et al. . |
| 4,475,983 | 10/1984 | Bader et al. . |
| 4,659,404 | * 4/1987 | Butt ..................................... 156/62.2 |
| 4,681,817 | 7/1987 | Shinada . |
| 4,713,300 | 12/1987 | Sowman et al. . |
| 4,732,818 | 3/1988 | Pratt et al. . |
| 4,743,511 | 5/1988 | Sowman et al. . |
| 4,748,136 | * 5/1988 | Mahulikar et al. .................... 501/32 |
| 4,844,848 | 7/1989 | Clark et al. . |
| 4,876,158 | 10/1989 | Onuki et al. . |
| 4,939,038 | * 7/1990 | Inabata ................................. 428/402 |
| 5,004,498 | 4/1991 | Shimamura et al. . |
| 5,089,354 | 2/1992 | Nakashima et al. . |
| 5,118,342 | 6/1992 | Kamimura et al. . |
| 5,158,933 | 10/1992 | Holtz et al. . |
| 5,223,213 | 6/1993 | Kamimura et al. . |
| 5,750,249 | * 5/1998 | Walther et al. ....................... 428/328 |
| 5,835,841 | * 11/1998 | Yamada et al. ...................... 428/546 |

* cited by examiner

Primary Examiner—Hoa T. Le
(74) Attorney, Agent, or Firm—Oblon, Spivak, McClelland, Maier & Neustadt, P.C.

(57) ABSTRACT

A composite material is composed of a matrix and dispersed components which form a discontinuous three-dimensional network structure in the matrix. It permits the dispersed components to fully exhibit the characteristic properties without any loss of mechanical properties. A process for producing the above-mentioned composite material includes preparing a raw material powder such that granules of desired shape for the matrix are discontinuously covered with components of desired shape for the dispersed phase, molding the raw material powder into a desired shape, and heating the molded article.

15 Claims, 4 Drawing Sheets

<RAW MATERIAL>

<MOLDING>

<SINTERING OR THERMOSETTING>

FIG. 8

COMPOSITE MATERIAL HAVING DISCONTINUOUS THREE-DIMENSIONAL NETWORK STRUCTURE AND PRODUCTION THEREOF

This application is a Division of application Ser. No. 08/651,624, filed on May 22, 1996, now U.S. Pat. No. 5,835,841, which is a continuation of application Ser. No. 08/139,036, filed on Oct. 21, 1993, abandoned.

BACKGROUND OF THE INVENTION

1. Field of the Invention

The present invention relates to a composite material composed of a matrix of ceramics, metal, polymer, or the like and components dispersed in the matrix. The present invention also relates to a process for producing said composite material.

2. Description of the Related Art

A combination of two or more dissimilar materials improves the characteristic properties, such as wear and abrasion resistance, oxidation resistance, corrosion resistance, heat resistance, electrical and thermal conductivity, and mechanical strength, for which a monolithic material is not satisfactory. It also imparts new functional properties, such as magnetism, self-lubricity, and thermal and electrical conductivity, which a monolithic material does not possess. At present various materials are under study for new composite materials.

A composite material composed of a matrix and components (such as particles, whiskers, and fibers) of different materials from that of the matrix which are dispersed therein is noteworthy because the dispersed components exhibit the mechanical and functional properties. Therefore, it will find use for varied requirements which a monolithic material does not meet.

The composite material of conventional dispersion type is usually composed of a matrix and components randomly dispersed therein. It improves performance and functions owing to the dispersed component, but only insufficiently because the components are randomly dispersed.

To solve this problem, there was proposed a composite material in which the dispersed components constitute a continuous three-dimensional network structure. (Japanese Patent Laid-Open Nos. 243245/1985, 4750/1987, 119688/1989, 122066/1991, 174358/1991, and 37667/1992) it is claimed that the composite material permits the continuously dispersed component to fully exhibit its performance.

Japanese Patent Laid-open No. 243245/1985 discloses "a ceramic particles-reinforced metal composite material", which is composed of a porous ceramic skeleton (formed by sintering a mixture of ceramic material and ceramic whiskers) and a metal impregnated into pores in the ceramic skeleton. This composite material is claimed to have good heat shock resistance and crack resistance because of the continuous skeletal structure of the mixture of ceramic material and ceramic whiskers dispersed in the metal matrix.

Japanese Patent Laid-open No. 4750/1987 discloses "a positive temperature coefficient composition and a process for production thereof," said composition comprising a crystalline polymer and carbon whiskers of 0.05–1 mm in average length and 3–20 $\mu$m in diameter. This composition is claimed to have carbon whiskers forming a continuous three-dimensional network microstructure in the polymer matrix, so that it permits the reduction of the amount of carbon whiskers to be used, which contributes to providing good PTC properties and cost saving.

Japanese Patent Laid-open No. 119688/1989 discloses "a resin-molded electrode and a process for production thereof," said electrode comprising a base material of thermosetting resin and electrically conductive metal particles (e.g., lead particles) continuously and reticulately dispersed therein. This electrode is claimed to have good corrosion resistance and mechanical properties and to be inexpensive.

Japanese Patent Laid-open No. 122066/1991 discloses "an aluminum-impregnated silicon carbide composite material and a process for production thereof", said composite material comprising a porous silicon carbide and aluminum impregnated into pores in the silicon carbide. This composite material is claimed to be light in weight and superior in strength, heat resistance, and wear and abrasion resistance on account of its unique combination of components—aluminum impregnated into continuous pores in the porous silicon carbide.

Japanese Patent Laid-open No. 174358/1991 discloses "a composite material composed of carbon (90 to 30 mol %) and silicon carbide (10 to 70 mol %) both forming the continuous phase". This composite material is claimed to have a great flexural strength and hence retain its shape even after the carbon component has disappeared due to oxidation.

Japanese Patent Laid-open No. 37667/1992 discloses "light-weight high-stiffness ceramics and application thereof", said ceramics having three-dimensional continuous network structure formed in a reaction-sintered matrix. This ceramics is said to have a high specific modulus of elasticity by virtue of its composite structure.

The six composite materials mentioned above suffer a disadvantage in common that their strength depends on the strength of the matrix or dispersed component whichever lower in strength or the density of the composite material and hence a desired strength will not be attained only by dispersing the components in the continuous three-dimensional network structure. Their additional disadvantage is that the composite material is continuously subjected to internal stress due to the difference in thermal expansion of the matrix and dispersed components, which lowers their mechanical properties such as impact resistance. Moreover, they need a special process of forming a matrix or dispersed components in a porous network structure and then impregnating one material into the other. This process is not suitable for production of dense composite materials, nor is it suitable for mass production because of its low efficiency.

Further, the sixth composite material mentioned above is a light-weight, high-stiffness ceramics in which the dispersed components are formed in a network structure by using atomized or pulverized metal particles coated with ceramic powder. It is poor in sinterability and hence is poor in strength because of the continuously dispersed component.

In order to solve the above-mentioned problems involved in prior art technology, the present inventors carried out a series of studies and experiments, which led to the present invention.

SUMMARY OF THE INVENTION

It is an object of the present invention to provide a composite material which permits the dispersed components to fully exhibit their characteristic properties without lowering their mechanical properties. It is another object of the present invention to provide a process for producing said composite material.

The first aspect of the present invention resides in a composite material which comprises a matrix and dispersed components which form a discontinuous three-dimensional network structure in the matrix.

The composite material of the present invention permits the dispersed components to fully exhibit their characteristic properties without lowering the mechanical properties of the matrix.

It is not exactly known how the composite material of the present invention produces its outstanding effect. A probable reason is that the dispersed components forming the discontinuous three-dimensional network structure in the matrix produces a synergistic effect due to reinforcement by the dispersed components themselves (dispersed phase, such as particles, whiskers, and fibers) and reinforcement by the skeletal structure of the dispersed components.

The matrix and dispersed components function differently depending on temperature. At room temperature, the matrix (which is stronger than the dispersed components) supports a high stress and the dispersed components (forming the three-dimensional network structure) prevent dislocation and cracking (due to bridging). At high temperatures, the skeletal structure of the dispersed components protects the composite material from softening and deformation and prevents crystals from intergranular slipping and dislocation, thereby improving the instantaneous breaking strength and creep properties. The discontinuously dispersed components have an advantage over the continuously dispersed components forming a network structure. The former prevents cracks from propagating in the dispersed components or along the interface between the matrix and the dispersed components. Moreover, the composite material is so dense as to prevent the formation of pores which leads to breakage.

The dispersed components produce different effects depending on its purpose. The dispersed components for reinforcement serve to strengthen the material and form a discontinuous three-dimensional skeletal structure, which prevents the formation of pores which leads to breakage. The skeletal structure also serves to resist a high stress and the dispersed components prevent the dislocation and cracking between the adjoining networks. This improves the strength and toughness of the composite material. If the dispersed components are heat-resistant, they form a heat-resistant skeletal structure which prevents the matrix from softening and deformation. Moreover, the dispersed components serve to prevent the intergranular slipping and dislocation due to the softening of the crystal interface. This improves the instantaneous breaking strength and creep properties at high temperatures. Unlike the continuous phase, the discontinuously dispersed components prevent cracks from propagating through the dispersed components or along the interface between the matrix and the dispersed components. If the dispersed components are intended for functional properties, it yields a denser composite material than dispersed components of continuous network structure. This prevents the formation of pores (leading to breakage) and imparts the desired functional properties without sacrificing strength.

The reticulately dispersed components exhibit their characteristic properties more distinctly than uniformly dispersed components. Moreover, the amount of dispersed components can be decreased as compared with dispersed components of continuous network structure.

For reasons mentioned above, the composite material of the present invention permits the dispersed components to fully exhibit their characteristic properties without lowering the mechanical properties of the matrix.

The second aspect of the present invention resides in a process for producing a composite material which is composed of a matrix and dispersed components which form a discontinuous three-dimensional network structure in the matrix, said process comprising the steps of preparing a raw material powder such that granules of desired shape for the matrix are discontinuously covered with components of desired shape for the dispersed phase, molding the raw material powder into a desired shape, and heating the molded article.

The process of the present invention yields easily a composite material which permits the dispersed components to fully exhibit their characteristic properties without lowering the mechanical properties of the matrix.

It is not exactly known how the process of the present invention produces its outstanding effect. A probable reason is as follows: The process consists of three steps. In the first step, granules of desired shape for the matrix are discontinuously covered with components of desired shape for the dispersed phase. In the second step, the raw material powder is molded into a desired shape. The resulting molded article contains the discontinuously dispersed components between adjoining particles on one or both of the particles forming the matrix. In the third step, the molded article is heated for sintering so that adjoining particles not separated by the dispersed components fuse together and the molded article as a whole becomes dense. In this way there is obtained a composite material composed of a matrix and discontinuously dispersed components forming a three-dimensional network structure in the matrix.

If the dispersed components are intended for reinforcement, it forms a discontinuous three-dimensional skeletal structure, which prevents the formation of pores which leads to breakage. The skeletal structure also resists a high stress and the dispersed components prevent the dislocation and cracking between the adjoining networks. This improves the strength and toughness of the composite material. If the dispersed components are heat-resistant, they form a heat-resistant skeletal structure which prevents the matrix from softening and deformation. Moreover, the dispersed components prevent the intergranular slipping and dislocation due to the softening of the crystal interface. This improves the instantaneous breaking strength and creep properties. Unlike the continuous phase, the discontinuously dispersed components prevent cracks from propagating through the dispersed components or along the interface between the matrix and the dispersed components. If the dispersed components are intended for functional properties, it yields a denser composite material than dispersed components of continuous network structure. This prevents the formation of pores (leading to breakage) and imparts the desired functional properties without sacrificing strength.

For reasons mentioned above, the process of the present invention yields a composite material which permits the dispersed components to fully exhibit their characteristic properties without lowering the mechanical properties of the matrix.

DETAILED DESCRIPTION OF THE INVENTION

The composite material of the present invention comprises a matrix and dispersed components which form a discontinuous three-dimensional network structure in the matrix.

The matrix is a base material of the composite material. It may be selected from ceramics, metals, resins, and intermetallic compounds, which may be crystalline or amorphous.

The dispersed components in the matrix are intended to improve the mechanical and functional properties of the matrix. They may be selected from ceramics, metals, resins, and intermetallic compounds, which may be crystalline or amorphous and in the form of particles, whiskers, or fibers. These materials should have good chemical and mechanical properties (such as heat resistance, corrosion resistance, high hardness, and free cutting properties) as well as good functional properties (such as thermal conductivity, adiabatic properties, electrical conductivity, magnetism, and piezoelectric properties).

Figure 1:
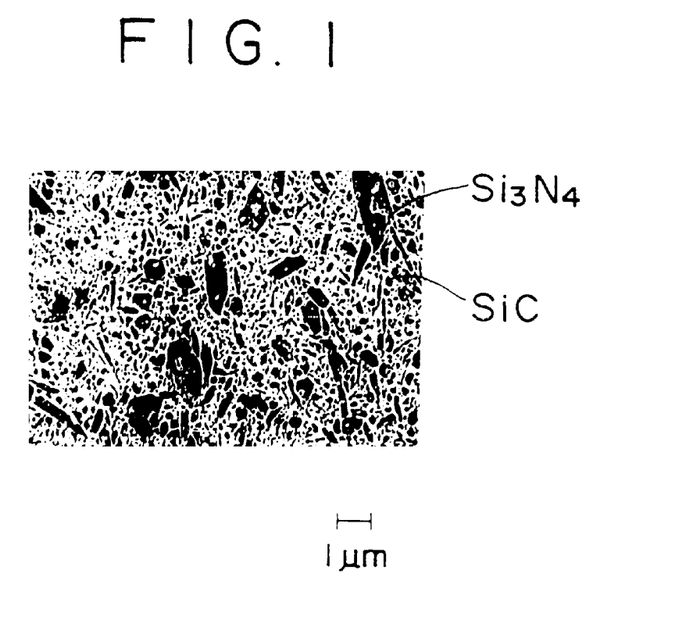
FIG. 1 is an SEM photograph (×10000) showing the particle structure in the cross section of the composite material obtained in Example 1.
Figure 2:
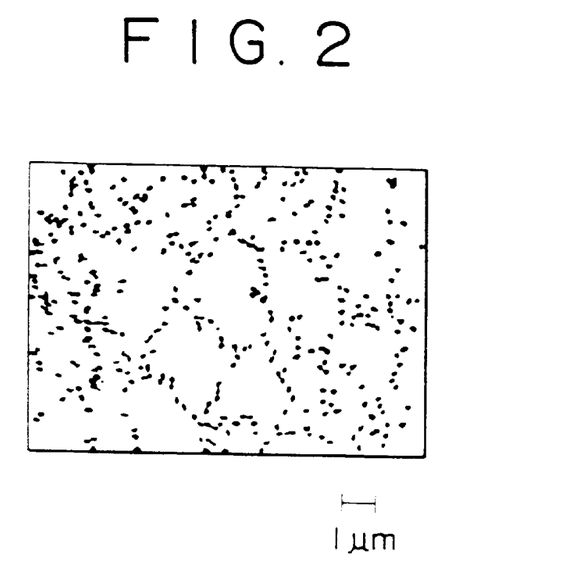
FIG. 2 is a schematic drawing prepared by tracing SiC particles alone in the SEM photograph in FIG. 1.
Figure 5:
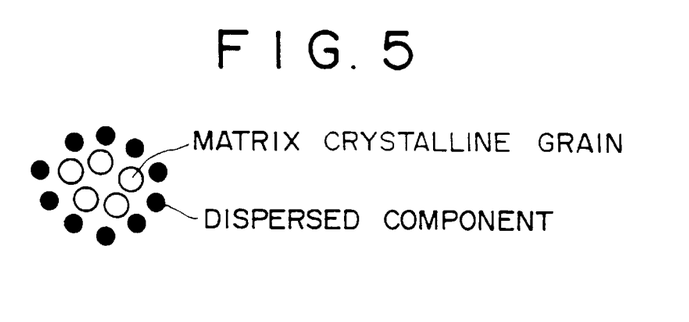
FIG. 5 is a schematic representation showing how the dispersed components are present in the matrix in the composite material of the present invention.
Figure 6:
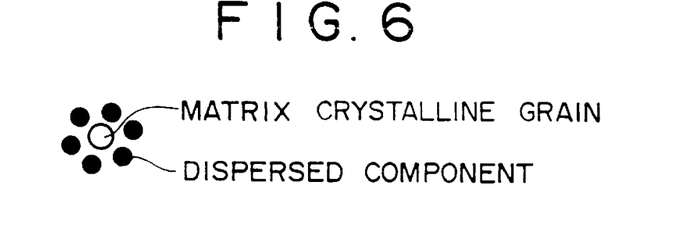
FIG. 6 is a schematic representation showing how the dispersed components are present in the matrix in the composite material of the present invention.

The term "discontinuous three-dimensional network structure" as used in the present invention denotes the structure as shown in FIGS. 1 and 2. It should be noted that the dispersed components are discrete or only partly joined (in contact) in the matrix although they form a three-dimensional network structure. If the matrix is composed of crystalline grains, a single network is formed around several (e.g. 3 to 5) grains as a unit, as shown in FIG. 5. If a single network is formed on a single grain, as shown in FIG. 6, the resulting composite material will have a low strength because the dispersed components occupy a relatively large portion in the whole grain boundary.

The state of dispersion is not specifically restricted so long as the discontinuous network structure is formed as mentioned above. A single network may have a form of polygon, circle, or ellipse, or an irregular form. The dispersed components are discrete, but may be partly continuous to an extent not detrimental to the effect and function of the present invention.

According to the present invention, the size of a single network should preferably be in the range of 1 $\mu$m to 2 mm. With a size smaller than 1 $\mu$m, the network will not contribute to strength satisfactorily because of its high density in the matrix which adversely affects the sinterability. With a size larger than 2 mm, the network will not permit the dispersed components to produce the effect of the skeletal structure.

According to the present invention, the size of the dispersed components is defined as follows. In the case of particulate dispersed component, the particle diameter should preferably be smaller than 300 $\mu$m on average. With a particle diameter larger than 300 $\mu$m, the dispersed components may not produce the sufficient effect of the network structure because of its low dispersion density. In the case of fibrous dispersed components (whiskers or fibers), the diameter should preferably be smaller than 300 $\mu$m on average. With a diameter larger than 300 $\mu$m, the dispersed components may not produce the sufficient effect of the network structure because of its low dispersion density. A size smaller than 180 $\mu$m is desirable to easily form the discontinuous network structure.

According to the present invention, the amount of the dispersed components should preferably be 0.01 to 70 vol % in the matrix. With an amount less than 0.01 vol %, the dispersed components may not permit the skeletal structure to exhibit its effect and functional properties satisfactorily because of the enlarged distance between dispersed components. With an amount more than 70 vol %, the dispersed components of the network structure have such a high density as to adversely affect the sinterability and strength. A more desirable amount is in the range of 3 to 30 vol %.

As the size or the amount of the dispersed components or the network increases, the resulting composite material tends to decrease in strength and impact resistance and to lose the effect of the network structure.

There are a large variety of combinations for the matrix and dispersed components, which are selected from ceramics, metals, polymers, and the like.

Examples of combination for the ceramic matrix and the dispersed components include silicon nitride-silicon carbide, silicon nitride-silica, silicon nitride-boron nitride, silicon nitride-titanium nitride, silicon nitride-titanium carbide, silicon nitride-ferrite magnet, silicon carbide-alumina, silicon carbide-aluminum nitride, silicon carbide-titanium nitride, titanium carbide-silicon carbide, alumina-titanium carbide, alumina-zirconia, alumina-zircon, alumina-silicon nitride, alumina-diamond, alumina-aluminum nitride, mullite-alumina, mullite-zirconia, sialon-silicon carbide, zirconia-alumina, glass-silicon carbide, glass-alumina, lead titanate zirconate-silicon carbide, lead titanate zirconate-barium titanate, lead titanate-strontium titanate, cordierite-mullite, and zirconia-nickel-chromium alloy. If the dispersed components are ceramics, the above-mentioned combination may be reversed.

The matrix of ceramics may be given thermal and electrical conductivity if it is incorporated with dispersed components of silicon carbide, titanium carbide, titanium oxide or the like (which has a low electrical resistance) or a nickel-chromium alloy such that the dispersed components are close to each other to such an extent that they do not harm sinterability. The resulting ceramics-based composite material can be subjected to electro-discharge machining. If the distance between the dispersed components (particularly those of silicon carbide or metal-base material with high thermal conductivity) is properly controlled, it is possible to give the high thermal conductivity while keeping the electrical insulation. The resulting composite material will find use as the substrate. If the matrix is incorporated with a free-cutting material, the resulting composite material will have improved machinability without reducing its strength.

Examples of combination for the metal matrix and the dispersed components include nickel-thoria, nickel-chromium alloy-thoria, nickel-chromium alloy-yttria, iron-chromium alloy-yttria, iron-chromium alloy-zirconia, iron-chromium alloy-alumina, aluminum-tungsten, aluminum-stainless steel, aluminum-carbon, aluminum-boron, aluminum-alumina, aluminum-silicon carbide, aluminum-yttria, magnesium (or magnesium alloy)-alumina, aluminum alloy-alumina, nickel (or nickel alloy)-alumina, molybdenum (or molybdenum alloy)-alumina, magnesium-silicon carbide, copper-alumina, copper-tungsten, copper-yttria, nickel-chromium alloy-yttria, nickel-chromium alloy-zirconia, nickel-chromium alloy-calcia, nickel-chromium alloy-silica, and silver-tungsten. If the dispersed components are of a metal, the above-mentioned combination may be reversed.

The matrix of metal may be given adiabatic properties if it is incorporated with dispersed components of a metal or ceramics such as zirconia (which has a low thermal conductivity) such that the dispersed components are separate to such an extent that they do not harm the mechanical properties.

Examples of combination for the polymer matrix and the dispersed components include polyvinyl chloride-lead (or lead alloy), polyvinyl chloride-manganese dioxide, polypropylene-talc, polypropylene-calcium carbonate, polypropylene-magnesium carbonate, epoxy resin-silicon carbide, epoxy resin-silica, epoxy resin-glass, silicone resin-silicon carbide, polyethylene-carbon, thermosetting resin-silica, rubber-carbon black, resin-graphite, resin-nickel, and carbon-silicon carbide.

The composite material of the present invention permits the dispersed components to fully exhibit their ability to enhance the properties and improve the functions without lowering the mechanical properties of the matrix.

The process of the present invention permits the dispersed components having functional properties such as good electrical conductivity, thermal conductivity, and magnetism to be dispersed at close intervals with a network structure. With the dispersed components arranged at adequate intervals, the composite material will exhibit higher mechanical properties and similar characteristic properties, as compared with those of the dispersed components of the continuous phase.

The process of the present invention makes the matrix stiff without any loss of strength, toughness, and impact resistance if stiff components are discontinuously dispersed therein.

The composite material of the present invention will be reinforced not only in the direction of orientation (due to pinning effect) but also three-dimensionally if whiskers as the dispersed components are arranged such that they form the three-dimensional structure perpendicular to the direction of orientation.

According to a preferred embodiment of the present invention, the composite material is composed of a matrix and dispersed components which form a discontinuous three-dimensional network structure in the matrix, and the matrix surrounded by the three-dimensional networks of the dispersed components may be uniformly incorporated with an additive to enhance the characteristic properties and to improve functions. The composite material enables to prevent the dislocation of crystalline grains in the network structure, to increase hardness, and to improve heat resistance, oxidation resistance, wear and abrasion resistance, strength, stiffness, and thermal conductivity.

The additive may be one which has good mechanical properties (such as heat resistance, corrosion resistance, chemical resistance, stiffness, hardness, and free-cutting properties) and good functional properties (such as thermal conductivity, heat adiabatic properties, electrical conductivity, magnetism, and piezoelectric properties). The dispersed components may be selected from ceramics, metals, resins, and intermetallic compounds, which may be crystalline or amorphous, in the form of particles, whiskers, or fibers. If the additive has good mechanical properties and the dispersed components for the network structure have good functional properties, the resulting composite material will have both good mechanical properties and good functional properties.

In the case of amorphous matrix, it is desirable that the above-mentioned reinforcing particles be uniformly dispersed in the matrix surrounded by the three-dimensional networks of the dispersed components.

In the case of crystalline matrix, it is desirable that the above-mentioned reinforcing particles be uniformly dispersed in or on the crystalline grains surrounded by the three-dimensional networks of dispersed components. Dispersion may be either in or on the crystalline grains to improve mechanical properties, while dispersion on the crystalline grains (or at the granular interface) is desirable to improve functional properties.

Figure 7:
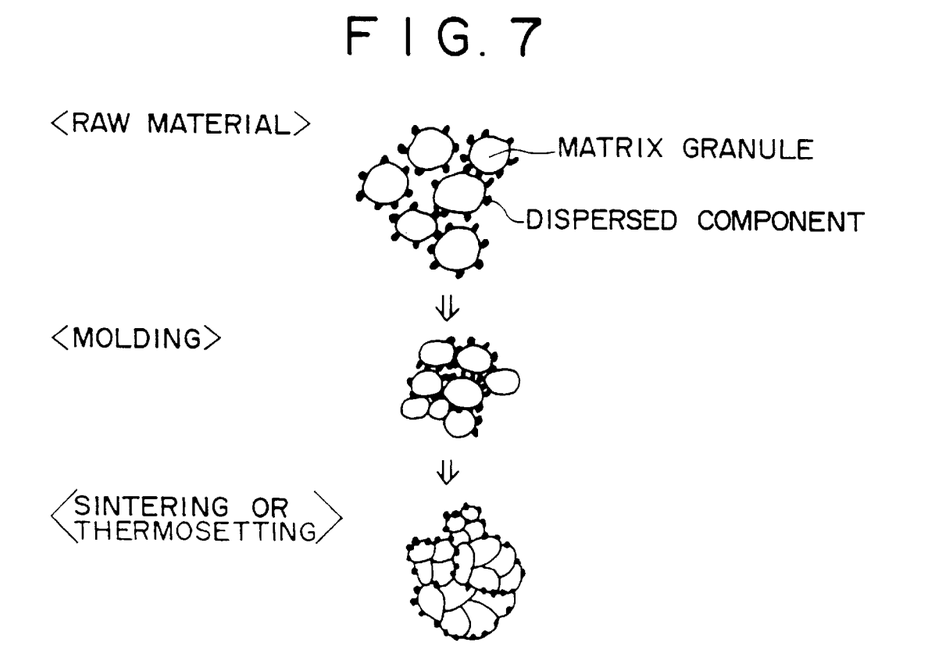
FIG. 7 is a schematic drawing showing the process of producing the composite material of the present invention.

The process of the present invention may be practiced as follows to produce the composite material containing discontinuously dispersed components which form the three-dimensional network structure. First, a raw material powder is prepared, as shown in FIG. 7, by sprinkling granules of desired shape for the matrix with components to be discontinuously dispersed or by partially coating granules for the matrix with components to be dispersed by CVD or PVD process. The raw material powder is molded into a desired shape. (If necessary, the material may be subjected to cold isostatic pressing.) The molded article finally undergoes sintering or thermosetting. The result is that the dispersed components form a discontinuous three-dimensional structure around the matrix.

The granule for the matrix has a diameter not larger than 2.0 mm (dm). The dispersed components in the form of particles, whiskers or the like should have an average primary particle diameter or an average diameter (dp) not larger than 300 $\mu$m. The dp/dm ratio should be in the range of 0.50 to $1 \times 10^{-6}$, so that the dispersed components form the three-dimensional network structure to fully exhibit their performance. With the dp/dm ratio in the range of 0.4 to $6 \times 10\ 5^{-5}$, the dispersed components readily form the discontinuous three-dimensional network structure. The particles of the dispersed components being not larger than 180 $\mu$m in diameter would be preferable to readily form the discontinuous network structure.

The process of the present invention may be practiced differently as follows depending on the material to be used for the matrix.

In the case of ceramic matrix, the material for the matrix is mixed with a sintering agent by wet or dry process and then made into granules of uniform size by disintegration or spray drying. The granules are sprinkled with the discontinuously dispersed components. The resulting raw material powder is molded by mold pressing, followed by cold isostatic pressing, if necessary. The molded article finally undergoes sintering under normal pressure, hot pressing, or hot isostatic pressing. In this way there is obtained the composite material of the present invention.

In the case of metal matrix, the material for the matrix is made into granules of uniform size by disintegration or atomizing. The granules are sprinkled with the dispersed components or partially coated with the dispersed components. The resulting raw material powder is molded, and the molded article is sintered. In this way there is obtained the composite material of the present invention.

In the case of polymer matrix, the material for the matrix is mixed with additives such as a filler and surface treating agent. The mixture is formed into spherical or cylindrical pellets, and the pellets are sprinkled with the dispersed components. The resulting raw material powder is filled into a mold and pressed with heating. In this way there is obtained the composite material of the present invention.

The process of the present invention is efficient because the addition of the dispersed components is accomplished in a single step.

The composite material of the present invention will find use as a structural material or a functional material because it permits the dispersed components to fully exhibit their performance. If silicon nitride (which has a high strength at room temperature) is incorporated with silicon carbide (which is stable at high temperatures) such that the latter forms a three-dimensional network structure in the former, the resulting composite material has improved strength (at both room temperature and high temperatures), improved creep properties, and improved oxidation resistance. It can be by far superior to the conventional one in mechanical properties (such as modulus of elasticity) and electrical properties (such as conductivity).

If the composite material of the present invention is designed for use as an IC sealing compound (resin), the resin matrix should be incorporated with silicon carbide, aluminum nitride, or boron nitride (which has a high thermal conductivity) such that the latter forms a discontinuous three-dimensional structure. The resulting composite material will be improved in thermal conductivity without any loss in electrical insulating properties.

The stainless steel matrix may be incorporated with zirconia or alumina (which has high stiffness and hardness) such that the latter forms a discontinuous three-dimensional network structure. The resulting composite material is improved in wear and abrasion resistance, friction resistance, and stiffness without any loss of strength. Incorporation with an adiabatic material will give rise to a composite material having a low thermal conductivity.

According to a preferred embodiment of the present invention, the composite material is produced as follows: First, a raw material powder for the matrix is mixed with an additive to reinforce the matrix or to impart the functional properties. The resulting mixture is formed into granules of desired shape. The granules are sprinkled with the dispersed components of desired shape. The formed raw material powder is molded, followed by heating. Thus there is obtained a composite material composed of the matrix and the dispersed components, in which the components are dispersed in a discontinuous network structure and the additive is uniformly dispersed in the matrix surrounded by the three-dimensional networks.

Figure 8:
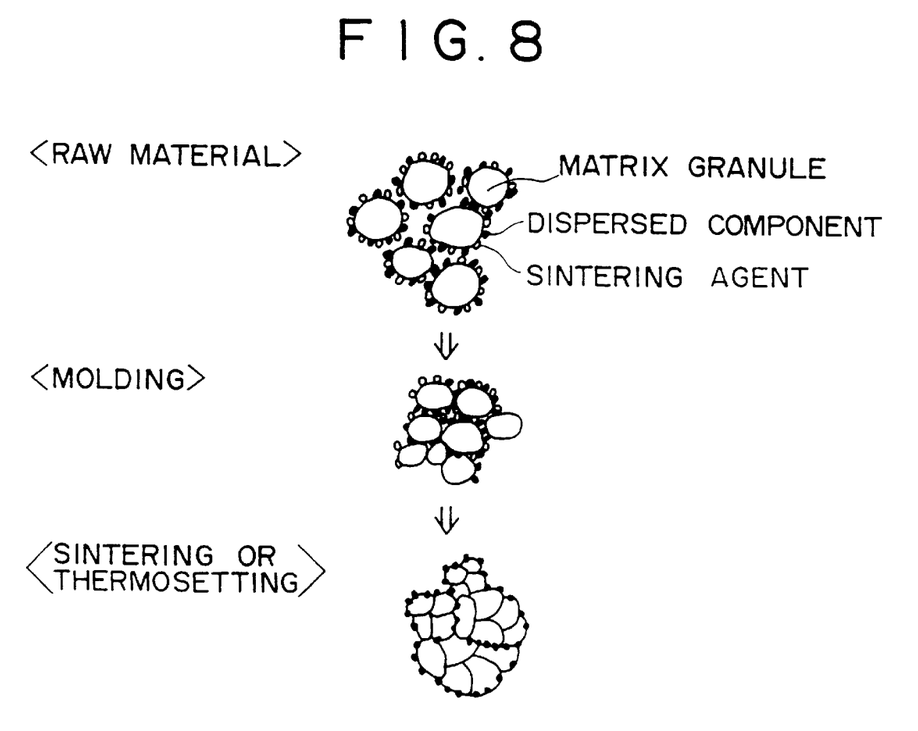
FIG. 8 is a schematic drawing showing the process of producing the composite material of the present invention.

According to another preferred embodiment of the present invention, the composite material is produced as follows, as shown in FIG. 8: First, a raw material for the matrix is formed into granules of desired shape. The granules are sprinkled with components of desired shape for the dispersed phase and a sintering agent which is equal to or smaller than said components. The resulting raw material powder is molded, followed by heating. Thus there is obtained a composite material composed of the matrix and the dispersed components, the latter forming a three-dimensional network structure in the former. This process permits the dispersed components to readily form a discontinuous three-dimensional network structure and also permits the molded article to be sintered easily.

The sintering agent may be of the same material as the matrix or a common sintering material for the dispersed components. For the composite material of silicon nitride-silicon carbide, the sintering agent may be silicon nitride, yttria (as a sintering material for silicon nitride), carbon or boron (as a sintering material for silicon carbide), or alumina. Other examples include alumina, spinel, silica, lanthanum oxide, nickel, and copper. The sintering agent finer than the particles for the matrix or dispersed components would be preferable to further improve sintering property.

EXAMPLES

The invention will be described in more detail with reference to the following examples.

Example 1

$Si_3N_4$ powder (having an average primary particle diameter of 0.3 $\mu$m) and $Y_2O_3$ powder (having an average primary particle diameter of 1 $\mu$m) were mixed in a ratio of 84 wt % to 6 wt % by wet process using a ball mill. The resulting granules (having an average particle diameter smaller than several $\mu$m) were sprinkled with SiC powder (having an average primary particle diameter of 0.1 $\mu$m) in an amount of 10 wt % (10 vol %) of the total amount in a manner to disperse the SiC powder discontinuously. The resulting powder mixture was die-pressed in a mold, and the article was sintered at 1850° C. for 4 hours under a pressure of 100 MPa. (Sample No. 1)

The resulting sintered product was examined by observing its plasma-etched cross section. It was found that the SiC particles are discontinuously dispersed three-dimensionally and reticulately in the $Si_3N_4$ matrix, as shown in FIG. 1 (an SEM photograph) and FIG. 2 (a tracing of SiC particles in FIG. 1). It was also found that several $Si_3N_4$ crystalline grains are present in a single network consisting of SiC particles. White parts on the photograph of FIG. 1 indicate the particle boundaries.

Comparative Example 1

$Si_3N_4$ powder (having an average primary particle diameter of 0.3 $\mu$m) and $Y_2O_3$ powder (having an average primary particle diameter of 1 $\mu$m) were mixed in a ratio of 84 wt % to 6 wt % by wet process using a ball mill. The resulting granules (having an average particle diameter smaller than 500 $\mu$m) were sprinkled with SiC powder (having an average primary particle diameter of 0.4 $\mu$m) in an amount of 10 wt % of the total amount in a manner to disperse the SiC powder continuously. The resulting powder mixture was molded, followed by sintering, in the same manner as in Example 1. (Sample No. C1)

The resulting sintered product was examined by observing its cross section. It was found that the SiC particles are continuously dispersed three-dimensionally and reticulately in the $Si_3N_4$ matrix.

Comparative Example 2

$Si_3N_4$ powder (having an average primary particle diameter of 0.3 $\mu$m), $Y_2O_3$ powder (having an average primary particle diameter of 1 $\mu$m), and SiC powder (having an average primary particle diameter of 0.4 $\mu$m) were mixed all at once in a ratio of 84 wt %, 6 wt %, and 10 wt % by wet process using a ball mill. The resulting granules (having an average particle diameter smaller than 500 $\mu$m), with the SiC particles uniformly dispersed in the matrix, underwent molding and sintering in the same manner as in Example 1. (Sample No. C2)

Figure 3:
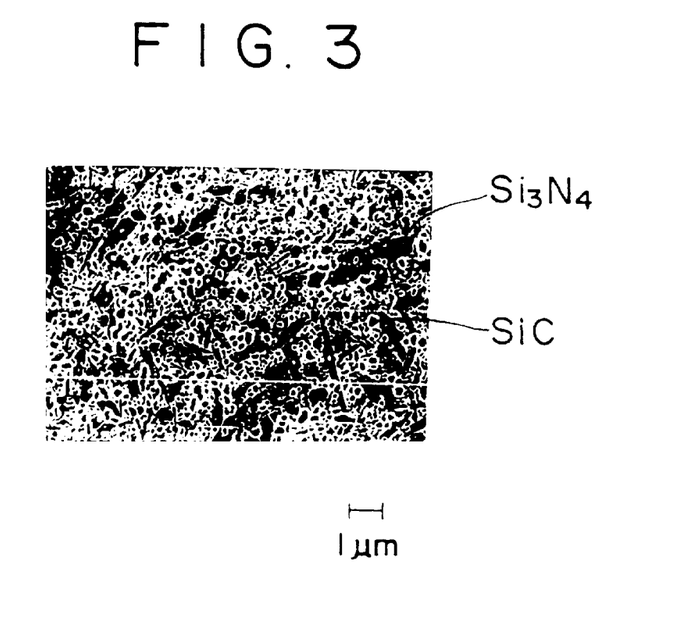
FIG. 3 is an SEM photograph (×10000) showing the particle structure in the cross section of the composite material obtained in Comparative Example 2.
Figure 4:
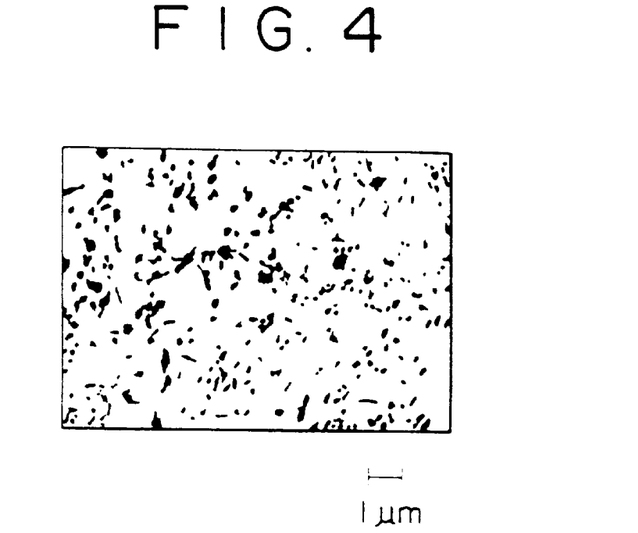
FIG. 4 is a schematic drawing prepared by tracing SiC particles alone in the SEM photograph in FIG. 3.

The resulting sintered product was examined by observing its cross section. It was found that the SiC particles are uniformly dispersed in the $Si_3N_4$ matrix, as shown in FIG. 3 (an SEM photograph) and FIG. 4 (a tracing of SiC particles in FIG. 3).

Comparative Examples 3 and 4

A sintered product of $Si_3N_4$ having no SiC dispersed therein and a sintered product composed of SiC alone were prepared. (Sample No. C3 and Sample No. C4, respectively) Evaluation Tests The samples in Example 1 and Comparative Examples 1 to 4 were tested for flexural strength (at room temperature and 1400° C. (high temperature) according to the JIS 4-point flexural strength test method), electrical resistance (4-contact method), and elastic modulus (by the resonance method). The results are shown in Table 1.

It is clear from Table 1 that Sample No. 1 is superior in strength at room temperature and high temperature to Sample Nos. C1 to C4, and that Sample No. 1 is also superior in electrical resistance and elastic modulus to Sample No. C2 in which silicon carbide is uniformly dispersed.

Example 2

Copper powder, 250 mesh under (having an average particle diameter smaller than 100 μm) was sprinkled with alumina powder (2 vol %) having an average particle diameter of about 2 μm in a manner to disperse the alumina powder discontinuously. The resulting mixed powder underwent molding and sintering. The thus obtained sintered product was found to contain the alumina particles dispersed discontinuously, three-dimensionally, and reticulately in the copper matrix. It has a tensile strength of 30 kg/mm², which is 1.5 times as high as that of the sintered product in which aluminum powder of the same size of copper powder is uniformly dispersed. Also, it is comparable in electrical conductivity (1.8 μΩ-cm) to that sintered product.

Example 3

$Si_3N_4$ powder (having an average primary particle diameter of 0.3 μm), $Y_2O_3$ powder (having an average primary particle diameter of 1 μm), and $Al_2O_3$ powder (having an average primary particle diameter of 0.3 μm) were mixed all at once in a ratio of 92 wt %, 5 wt %, and 3 wt % by wet process using a ball mill. The resulting granules (having a particle diameter smaller than 500 μm) were sprinkled with a mixture of SiC particles (having a primary particle diameter of 0.4 μm) in an amount of 10 wt % of the total amount

TABLE 1

| Sample No. | Matrix | Dispersed component | Sintering agent | Sintering method | State of dispersed phase | Flexural strength at room temperature (MPa) |
|---|---|---|---|---|---|---|
| 1 | $Si_3N_4$ | 10% SiC | 6% $Y_2O_3$ | Hot pressing | Three-dimensional, reticulate, discontinuous | 1140 |
| 3 | $Si_3N_4$ | 10% SiC | 5% $Y_2O_3$ 3% $Al_2O_3$ | Under normal pressure | Three-dimensional, reticulate, discontinuous | 750 |
| 5 | $Si_3N_4$ | 10% SiC | 5% $Y_2O_3$ 3% $Al_2O_3$ | Under normal pressure | Three-dimensional, reticulate, discontinuous + uniform dispersion in network structure | 755 |
| 7 | $Si_3N_4$ | 10% SiC | 5% $Y_2O_3$ 3% $Al_2O_3$ | Under normal pressure | Three-dimensional, reticulate, discontinuous | 770 |
| C1 | $Si_3N_4$ | 10% SiC | 6% $Y_2O_3$ | Hot pressing | Three-dimensional, reticulate, continuous | 380 |
| C2 | $Si_3N_4$ | 10% SiC | 6% $Y_2O_3$ | Hot pressing | Uniform | 980 |
| C3 | $Si_3N_4$ | — | 6% $Y_2O_3$ | Hot pressing | — | 900 |
| C4 | SiC | — | — | Hot pressing | — | 410 |
| C5 | $Si_3N_4$ | 10% SiC | 5% $Y_2O_3$ 3% $Al_2O_3$ | Under normal pressure | Uniform | 720 |

| Sample No. | Flexural strength at 1400° C. (MPa) | Electrical resistance (kΩ-cm) | Elastic modulus (GPa) | Creep rate (I/S) at 1200° C. | Thermal diffusivity (cm²/s) | Weight increase by oxidation (mg/cm²) | Density of sintered product (g/cm³) |
|---|---|---|---|---|---|---|---|
| 1 | 720 | 0.8 | 350 | — | — | — | 3.29 |
| 3 | 560 (1200° C.) | — | 330 | $1.0 \times 10^{-2}$ | 0.10 | 0.05 | 3.21 |
| 5 | 620 (1200° C.) | 2.0 | 330 | $5.6 \times 10^{-3}$ | 0.14 | 0.03 | 3.20 |
| 7 | 540 (1200° C.) | — | 324 | $7.0 \times 10^{-3}$ | — | — | 3.26 |
| C1 | 350 | 16 | 301 | Broken | — | — | 3.05 |
| C2 | 610 | $7.2 \times 10^8$ | 320 | — | — | — | 3.29 |
| C3 | 540 | $10^{10}$ | 310 | — | — | — | 3.29 |
| C4 | 370 | 0.2 | 400 | — | — | — | — |
| C5 | 360 (1200° C.) | $8 \times 10^9$ | 315 | $2.0 \times 10^{-2}$ | 0.07 | 0.16 | 3.26 | in a manner to disperse SiC particles discontinuously. The resulting mixed powder underwent press forming and cold isostatic pressing (3 t/cm$^2$), followed by sintering at 1850° C. for 4 hours under normal pressure (in nitrogen). (Sample No. 3)

Upon observation of its cross section, this sample was found to be composed of the Si$_3$N$_4$ matrix and the SiC particles dispersed therein three-dimensionally and reticulately.

This sample was tested for flexural strength, elastic modulus, creep rate, thermal diffusivity, and weight increase by oxidation in the same manner as in Example 1. The results are shown in Table 1.

Example 4

Atomized copper powder, 160 mesh under (having a particle diameter smaller than 90 μm) was sprinkled with a ball-milled mixture of alumina powder (2 vol %) having a primary particle diameter of about 0.1 μm and copper powder (about 20 μm). The resulting mixed powder was die-pressed under a pressure of 4 t/cm$^2$, followed by sintering. The thus obtained sintered product was found to be denser than the sample in Example 2.

It was also found to contain the alumina particles dispersed discontinuously, three-dimensionally, and reticulately in the copper matrix. It has a tensile strength of 34 kg/mm$^2$, which is 1.7 times as high as that of the conventional sintered product with a uniformly dispersed phase. Also, it is comparable in electrical conductivity (1.9 μΩ-cm) to that conventional one.

Example 5

Si$_3$N$_4$ powder (87 wt %), Y$_2$O$_3$ powder (5 wt %), Al$_2$O$_3$ powder (3 wt %), and SiC powder (5 wt %) were mixed all at once by wet process using a ball mill. The resulting granules (smaller than 500 μm) were sprinkled with SiC powder (having a primary particle diameter of 0.4 μm) in an amount of 10 wt % of the total amount in a manner to disperse the SiC powder discontinuously. The resulting mixed powder underwent press forming and cold isostatic pressing (3 t/cm$^2$), followed by sintering at 1850° C. for 4 hours under normal pressure (in nitrogen). (Sample No. 5)

Upon observation of its cross section, this sample was found to be composed of the Si$_3$N$_4$ matrix and the SiC particles dispersed therein discontinuously, three-dimensionally and reticulately, with SiC uniformly dispersed in the network structure.

This sample was tested for flexural strength, electrical resistance, elastic modulus, creep rate, thermal diffusivity, and weight increase by oxidation in the same manner as in Example 1. The results are shown in Table 1.

Example 6

Atomized SUS304 powder of 160 mesh under (having a particle diameter smaller than 90 μm) was sprinkled with zirconia powder (3 vol %) having an average primary particle diameter of about 0.5 μm in a manner to disperse the zirconia powder discontinuously. The resulting mixed powder was die-pressed under a pressure of 4 t/cm$^2$, followed by sintering at 1250° C. in vacuum.

The thus obtained sintered product was found to be composed of the SUS304 matrix and the zirconia particles dispersed therein discontinuously, three-dimensionally, and reticulately. Compared with the conventional sintered product in which the zirconia particles are continuously dispersed, it is denser by 10% or more, higher in tensile strength by 10% or more, lower in abrasion (pin on disk) by about 20%, and stiffer by about 7%.

Example 7

Si$_3$N$_4$ powder (having an average primary particle diameter of 0.3 μm), Y$_2$O$_3$ powder (having an average primary particle diameter of 1 μm), and Al$_2$O$_3$ powder (having an average primary particle diameter of 0.1 μm) were mixed all at once in a ratio of 92 wt %, 5 wt %, and 3 wt % by wet process using a ball mill. The resulting granules (having an average particle diameter smaller than 500 μm) were sprinkled with a mixture of Si$_3$N$_4$ powder and SiC particles (having a primary particle diameter of 0.4 μm), and the latter was dried and disintegrated to account for 10 wt % (10 vol %). The resulting mixed powder underwent press forming and cold isostatic pressing, followed by sintering at 1850° C. for 4 hours under normal pressure. (Sample No. 7)

This sample was found to be composed of the Si$_3$N$_4$ matrix and the SiC particles dispersed therein discontinuously, three-dimensionally, and reticulately. It was also found to be denser than the sample in Example 3.

This sample was tested for flexural strength, elastic modulus, and creep rate in the same manner as in Example 1. The results are shown in Table 1.

Comparative Example 5

Si$_3$N$_4$ powder (82 wt %), Y$_2$O$_3$ powder (5 wt %), Al$_2$O$_3$ powder (3 wt %), and SiC powder (10%) were mixed by wet process using a ball mill. The resulting granules (having a particle diameter smaller than 500 μm) underwent molding and sintering in the same manner as in Example 3. (Sample No. C5)

Upon observation of its cross section, this sample was found to be composed of the Si$_3$N$_4$ matrix and the SiC particles randomly dispersed therein.

This sample was tested for flexural strength, electrical resistance, elastic modulus, creep properties, thermal diffusivity, and weight increase by oxidation in the same manner as in Example 3. The results are shown in Table 1.

What is claimed is:

1. A process for producing a composite material which comprises a matrix and dispersed components forming a discontinuous three-dimensional network structure in the matrix, said matrix comprising granules, said process comprising;

preparing a raw material powder by covering granules discontinuously with dispersed components, molding the raw material powder, and heating the molded article.

2. The process of claim 1, wherein the granules for the matrix have a particle diameter (dm) not larger than 2 mm and the dispersed components have an average primary diameter (dp) not larger than 300 μm, with the dp/dm ratio being in the range of 0.70 to 1×10$^{-6}$.

3. The process of claim 2, wherein the dispersed components have an average primary particle diameter not larger than 180 μm.

4. The process of claim 1, wherein the raw material powder is prepared by sprinkling said granules of desired shape for the matrix with said dispersed components and a sintering agent having a particle diameter equal to or smaller than that of said dispersed components and said sintering agent are discontinuously dispersed on said granules for the matrix.

5. The process of claim 4, wherein the sintering agent is of the same material as that of the matrix.

6. The process of claim 4, wherein said sintering agent has a particle size which is finer than that of said matrix and said dispersed components.

7. The process of claim 1, wherein said dispersed component is present in an amount of 0.01 to 70 volume % of said composite material.

8. The process of claim 7, wherein each of said granules comprises an amorphous material.

9. The process of claim 8, wherein said dispersed components have an average particle size of not more than 180 μm.

10. The process of claim 1, wherein each of said granules comprises a plurality of crystalline grains.

11. The process of claim 1, wherein each of said granules comprises an amorphous material.

12. The process of claim 1, wherein the granules include an additive to reinforce the matrix or to impart a function to the matrix.

13. The process of claim 1, wherein the matrix and dispersed components comprise respectively silicon nitride-silicon carbide, silicon nitride-silica, silicon nitride-boron nitride, silicon nitride-titanium nitride, silicon nitride-titanium carbide, silicon nitride-ferrite magnet, silicon carbide-alumina, silicon carbide-aluminum nitride, silicon carbide-titanium nitride, titanium carbide-silicon carbide, alumina-titanium carbide, alumina-zirconia, alumina-zircon, alumina-silicon nitride, alumina-diamond, alumina-aluminum nitride, mullite-alumina, mullite- zirconia, sialon-silicon carbide, zirconia-alumina, glass-silicon carbide, glass-alumina, lead titanate zirconate-silicon carbide, lead titanate zirconate-barium titanate, lead titanate-strontium titanate, cordierite-mullite, and zirconia-nickel-chromium alloy.

14. The process of claim 1, wherein the matrix and dispersed components comprise respectively nickel-thoria, nickel-chromium alloy-thoria, nickel-chromium alloy-yttria, iron-chromium alloy-yttria, iron-chromium alloy-zirconia, iron-chromium alloy-alumina, aluminum-tunsten, aluminum-stainless steel, aluminum-carbon, aluminum-boron, aluminum-alumina, aluminum-silicon carbide, aluminum-yttria, magnesium (or magnesium alloy)-alumina, aluminum alloy-alumina, nickel (or nickel alloy)-alumina, molybdenum (or molybdenum alloy)-alumina, magnesium-silicon carbide, copper-alumina, copper-tungsten, copper-yttria, nickel-chromium alloy-yttria, nickel-chromium alloy-zirconia, nickel-chromium alloy-calcia, nickel-chromium alloy-silica, and silver-tungsten.

15. The process of claim 1, wherein the matrix and dispersed components comprise respectively polyvinyl chloride-lead or lead alloy, polyvinyl chloride-manganese dioxide, polypropylene-talc, polypropylene-calcium carbonate, polypropylene-magnesium carbonate, epoxy resin-silicon carbide, epoxy resin-silica, epoxy resin-glass, silicone resin-silicon carbide, polyethylene-carbon, thermo-setting resin-silica, rubber-carbon black, resin-graphite, resin-nickel, and carbon-silicon carbide.

* * * * *